A. HANSEN.
HARROW CART.
APPLICATION FILED APR. 17, 1916.
1,210,308.
Patented Dec. 26, 1916.
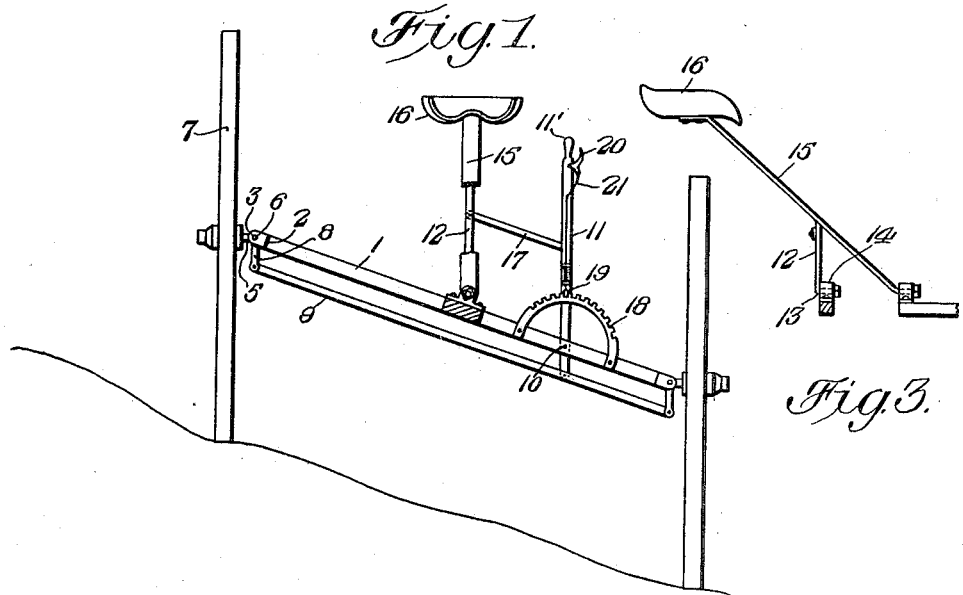
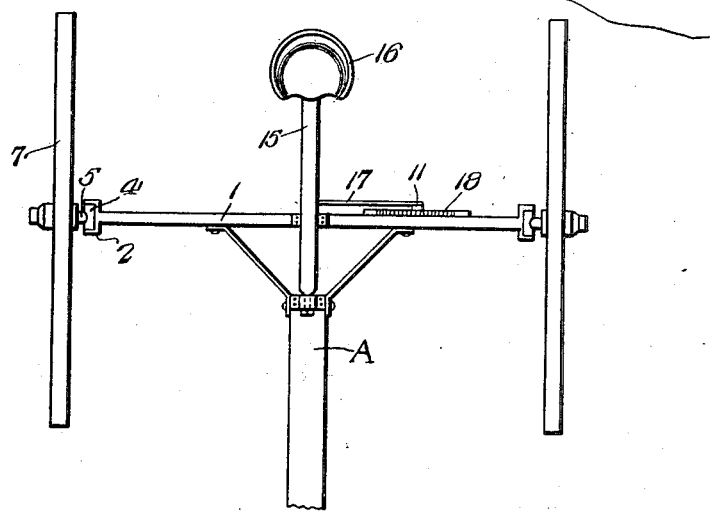
Witnesses
J H Crawford
Edwin Jones
Inventor
Hage Hansen,
By Victor J. Evans
Attorney

UNITED STATES PATENT OFFICE.

AAGE HANSEN, OF WALLA WALLA, WASHINGTON.

HARROW-CART.

1,210,308.  Specification of Letters Patent.  Patented Dec. 26, 1916.

Application filed April 17, 1916. Serial No. 91,813.

*To all whom it may concern:*

Be it known that I, AAGE HANSEN, a citizen of Denmark, residing at Walla Walla, in the county of Walla Walla and State of Washington, have invented new and useful Improvements in Harrow-Carts, of which the following is a specification.

This invention relates to harrow carts and has particular application to a cart used in the harrowing of hill sides or other unlevel surfaces.

The chief characteristic of this invention resides in the provision of a device of this character having means for raising and lowering the wheels thereof simultaneously, the parts being so arranged that when one wheel is raised the other is lowered and vice versa, and means coöperating therewith to impart a corresponding movement to the operator's seat.

Another important characteristic of this invention resides in the provision of a simple, efficient and durable device, and a device which may be manufactured at a nominal cost.

Other objects of the invention will appear as the specification is read in connection with the accompanying drawings in which:—

Figure 1 is a front elevation of my device showing the wheels and seat turned at an angle to conform to the inclination of a certain hill side. Fig. 2 is a top plan view. Fig. 3 is a side elevation of the seat and the supporting means therefor.

Referring to the drawings in detail, 1 designates an axle to which is connected any common form of tongue A. The axle 1 has its ends provided with parallel spaced legs 2 each of which is formed with alined openings 3. Between each of the spaced legs 2 are the bearings 4 of the stub axles 5, the bearings being pivotally mounted therein by means of pins 6, each of which extends through the openings 3 and through the openings formed in the bearings.

Journaled upon each of the stub axles 5 is a wheel 7 of any suitable construction. Formed on each of the bearings and extending downwardly at angles to the stub axle 5 is a crank arm 8. The crank arms 8 are pivotally connected at their free ends by means of a bar 9, the latter being arranged below and in parallelism with the axle 1. It will be seen from this construction that when the bar 9 is moved longitudinally, one of the stub axles 5 will be moved downwardly while the other is moved a corresponding distance upwardly, thereby causing the wheels upon the respective stub axle to assume elevated or lowered positions as the case may be.

Fulcrumed to the axle 1 adjacent one end thereof as at 10, is an operating lever 11 which is vertically arranged thereupon and has its lowest extremity pivotally connected to the bar 9, while the upper end extends a suitable distance and terminates in a handle 11′.

Swingingly mounted upon the upper face of the axle 1 at a point approximately the center thereof is the lower extremity of a vertically arranged rod 12, the extremity being bent at right angles as at 13 and rotatably mounted within a bearing 14. Loosely secured to the tongue A of the cart is the lower end of a leaf spring 15. The spring 15 extends rearwardly and upwardly and has its intermediate portions secured to the upper end of the rod 12, while the free or upper end is adapted to support the operator's seat 16. Connected with the rod 12 and lever 11 is a link 17 which rigidly connects the same and serves to retain the rod and lever in spaced parallel relation at all times. Rigidly secured to the axle 1 and having the ends thereof disposed upon opposite sides of the fulcrum 10 of the lever 11 is a segmental rack 18 which is so positioned with respect to the lever 11 as to lie within the arcuate movement thereof.

Slidably mounted upon the lever 11 and disposed adjacent the rack 18 is a spring pressed pawl 19 which is adapted to engage the rack and lock the lever 10 in any desired position.

In order to relieve the lever 11 of the influence of the pawl 19 I provide the lever with the short pivoted lever 20 which is disposed adjacent the handle 11′ thereof. This lever 20 is connected to the pawl 19 by means of a wire 21, whereby upon gripping the lever and moving the same toward the handle 11′ the wire will pull the pawl upwardly against the tension of the spring so as to disengage the pawl from the rack 18 whereby the lever may be moved to any desired position.

In practice when the harrow cart is traversing the side of a hill and it is desired that the operator's seat and body of the cart remain in horizontal position; by releasing the lever 11 from the rack, the lever may be shifted upon an arc, in either direction, whereby the stub axles will be elevated or lowered as the case may be. The lever 12 which supports the seat 16 being connected to the lever 11 by means of the link 17, the seat will move in a corresponding direction to that of the lever. It will therefore be seen that when the lever is moved within the arc to elevate or lower the wheels of the cart, the operator's seat 16 will be moved a corresponding distance, but owing to its mounting, the seat will remain at a horizontal plane at all times regardless of the position of the wheels whereby the operator may assume a vertical position to properly manipulate the harrow.

What I claim is:—

1. A harrow cart comprising an axle, stub axles pivotally mounted in the end of said axle for vertically swinging movement, said stub axles being rigidly connected to each other, a lever fulcrumed to said axle and connected to the stub axles and a seat swingingly mounted on said axle for horizontal movement and rigidly connected to said lever for the purpose described.

2. A harrow cart comprising an axle, stub axles pivoted to the ends of said axle for vertical swinging movement, said stub axles being rigidly connected to each other, a seat pivotally mounted on said axle for horizontal swinging movement, said seat being connected to said axle, means for adjusting the position of said seat and stub axles simultaneously, and means for locking the seat and stub axles in adjusted positions.

3. A harrow cart comprising an axle, stub axles pivotally mounted on the ends of said axles for vertically swinging movement, said stub axles being rigidly connected with each other, a seat pivotally mounted on said axle for horizontal swinging movement and connected to said stub axles and means for adjusting the position of said seat and stub axles simultaneously.

4. A harrow cart comprising an axle, stub axles pivotally mounted on the ends of said axles for vertically swinging movement, said stub axles being rigidly connected to each other, a lever fulcrumed to said axle and connected to the stub axles, a seat swingingly mounted on said axle for horizontal swinging movement and rigidly connected to said lever and means on said axle for locking the lever against movement.

In testimony whereof I affix my signature in presence of two witnesses.

AAGE HANSEN.

Witnesses:
HARRY LASATER,
E. R. BIRKES.

Copies of this patent may be obtained for five cents each, by addressing the "Commissioner of Patents, Washington, D C."